(12) United States Patent
Lawrence

(10) Patent No.: US 6,971,361 B2
(45) Date of Patent: Dec. 6, 2005

(54) BALANCE SHAFT ASSEMBLY

(75) Inventor: Howard J. Lawrence, Southampton (GB)

(73) Assignee: Caterpillar, Inc., Peoria, IL (US)

( * ) Notice: Subject to any disclaimer, the term of this patent is extended or adjusted under 35 U.S.C. 154(b) by 0 days.

(21) Appl. No.: 10/471,679

(22) PCT Filed: Mar. 18, 2002

(86) PCT No.: PCT/GB02/01078

§ 371 (c)(1),
(2), (4) Date: Sep. 12, 2003

(87) PCT Pub. No.: WO02/075134

PCT Pub. Date: Sep. 26, 2002

(65) Prior Publication Data

US 2004/0079316 A1 Apr. 29, 2004

(51) Int. Cl.$^7$ .............................................. F02B 75/06
(52) U.S. Cl. ................................................. 123/192.2
(58) Field of Search ..................................... 123/192.2

(56) References Cited

U.S. PATENT DOCUMENTS 4,523,553 A 6/1985 Backlund
5,947,074 A 9/1999 Yapici
6,471,008 B1 * 10/2002 Iwata ......................... 184/106

FOREIGN PATENT DOCUMENTS

| AT | 376014 | 10/1984 |
|---|---|---|
| DE | 19726501 | 2/1998 |
| GB | 2342699 | 4/2000 |

* cited by examiner

Primary Examiner—Noah P. Kamen

(57) ABSTRACT

Balance shaft assemblies are used in internal combustion engines to dampen primary and second order inertia forces. Known balance shaft assemblies typically require precision manufacturing and a rigid frame or housing. A balance shaft assembly (1) in accordance with this invention provides a low cost and less complex solution to engine balancing. The balance shaft assembly (1) includes an elongate housing (2) having a front end and a rear end, a balance shaft (5) which is rotatably supported between a front end bearing (6), a rear end bearing (7) and an intermediate bearing (12) in the housing (2). The housing (2) is transversely flexible relative to the balance shaft (5) to accommodate misalignment of the intermediate bearing (12) relative to the front and rear end bearings (6, 7). Consequently, the balance shaft assembly (1) can be less complicated and manufactured at a lower cost than known balance shaft assemblies.

18 Claims, 1 Drawing Sheet

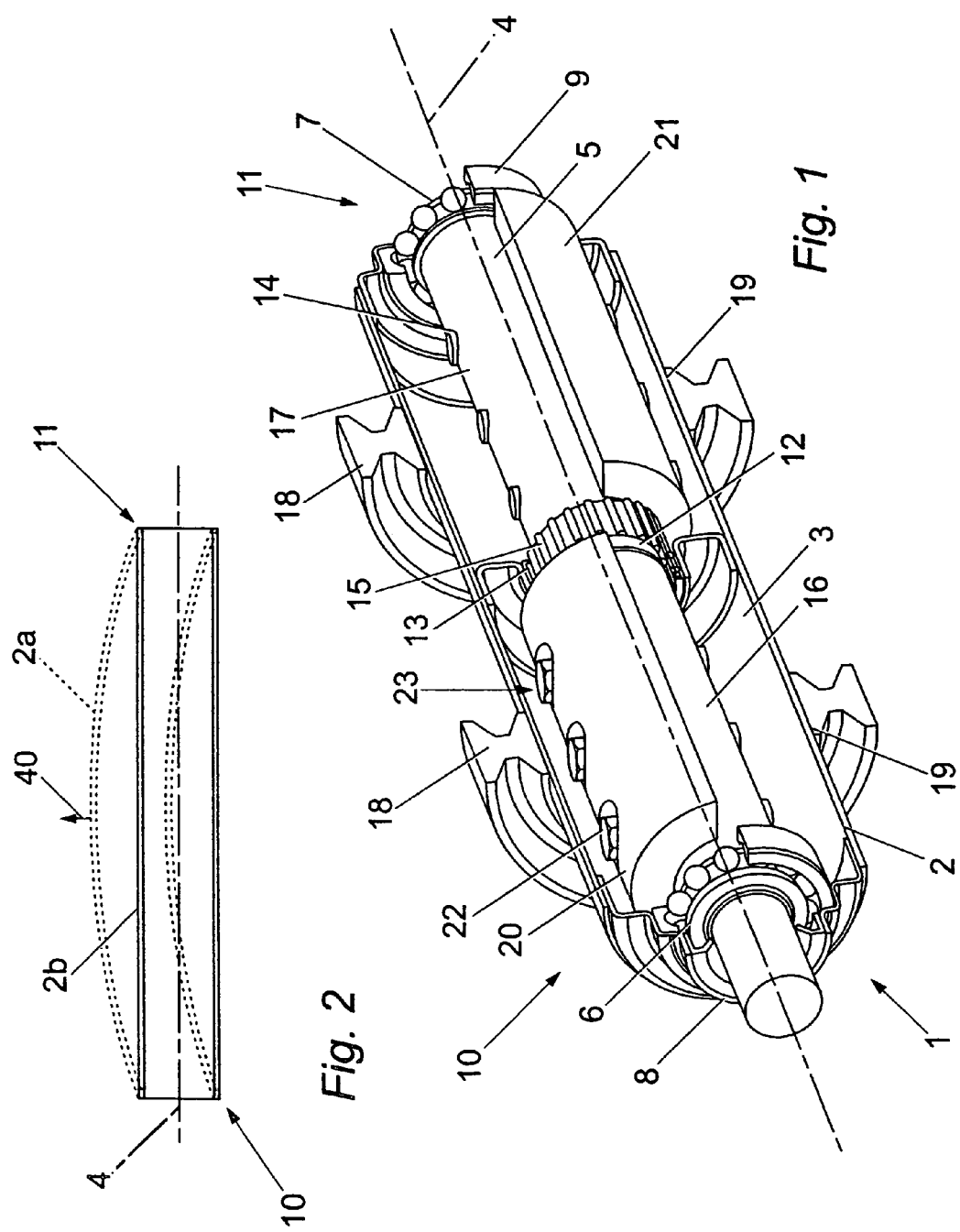

BALANCE SHAFT ASSEMBLY

TECHNICAL FIELD

This invention relates to a balance shaft assembly and to an engine including the balance shaft assembly.

BACKGROUND

In mobile machines, vehicle excitations are created from engine out-of-balance forces and couples (moments) generated by the rotating and reciprocating engine component masses.

In an in-line four-cylinder engine, for example, as the pistons reciprocate within the cylinders an inertia force is created by the reciprocating movement of each piston. If the inertia force of the moving pistons is not balanced, then vibration is caused, acting on the engine in the direction of travel of the pistons. The resultant vibration may be undesirable, particularly in mobile vehicles into which the engine may be fitted.

It is known to counterbalance the inertia forces of the pistons using one or more balance shafts. The or each balance shaft is typically located in the sump of an engine and suspended beneath the crankshaft. In in-line four cylinder engines such balance shafts are generally referred to as second order balance shafts and are rotated at twice engine speed. Typically, two contra-rotating balance shafts are employed.

Three cylinder engines also suffer from the aforementioned engine out-of-balance forces and couples. Balance shafts, referred to as primary balance shafts, are also employed to balance primary couple forces in three cylinder engines. Primary balance shafts are typically driven at engine speed.

Balance shafts must be precisely manufactured and engineered to operate effectively. A balance shaft typically comprises a rigid frame or housing in which a ferrous shaft is rotatably mounted by three bearings. A bearing is disposed at either end of the shaft, and an intermediate bearing is typically provided approximately in the centre of the shaft. Heavy-machined castings are typically required to ensure that the bearings at each end and the intermediate bearing are maintained in precise alignment. The rigid frame is typically machined employing line-bore machining. The housing is therefore designed to be rigid while the shaft may be allowed a small degree of radial deflection of movement relative to the housing.

Known balance shafts are typically positioned in the sump of an engine. Location of the balance shaft in the sump can result in aeration of oil in the sump and increased oil temperature.

Known balance shaft assemblies are also limited in the length of balance shaft which can be employed due to constructional limitations thereby limiting the efficiency with which the balance shaft assembly can overcome reciprocal inertia in the engine.

The conventional process for manufacturing the balance shaft assembly is expensive because of the precision machining and alignment that is required, and the assembly tends to be heavy.

A number of differences also exist between second order balance shafts and primary balance shafts giving rise to specific manufacturing requirements according to the type of balance shaft required. For example, in primary balance shafts, weights on the shaft are off-set with respect to each other.

Balance shaft characteristics are further determined by the engine to which the balance shaft is to be fitted. Accordingly, with known primary and second order balance shafts it is typically necessary to cast a balance shaft housing peculiar to the engine, thus giving rise to significant cost.

U.S. Pat. No. 4,523,553 discloses an engine with at least one balance shaft driven by the engine and arranged parallel to the crankshaft. However, the balance shaft suffers from length restrictions and is in communication with the engine lubricating system as it is not completely self-contained.

The present invention sets out to overcome the above-mentioned and other disadvantages of the prior art.

SUMMARY OF THE INVENTION

According to the invention there is provided a balance shaft assembly comprising an elongate housing provided with at least first and second bearings within said housing, and a balance shaft rotatably supported by said bearings, wherein the housing is flexible in relation to the balance shaft, such that the balance shaft has a greater transverse bending stiffness than the housing.

According to the invention there is also provided a balance shaft assembly comprising a flexible tubular housing having a front end and a rear end, a front end bearing mounted in the housing proximate the front end, a rear end bearing mounted in the housing proximate the rear end, an intermediate bearing mounted in the housing between the front and rear ends, and a balance shaft rotatably supported by the front end bearing, the rear end bearing and the intermediate bearing in the housing wherein the portion of the balance shaft rotatably supported by the intermediate bearing has a transverse stiffness greater than that of the intermediate bearing.

The invention also provides an engine including a balance shaft assembly as hereinbefore defined.

The invention also provides a method of loading a bearing in a balance shaft assembly comprising the steps of forming an elongate housing having a front end and a rear end; mounting a front end bearing, a rear end bearing and an intermediate bearing in the housing; rotatably supporting a balance shaft between the front end bearing, the intermediate bearing and the rear end bearing; and causing the intermediate bearing to become aligned with the front end and rear end bearings by lateral deflection of the intermediate bearing as a result of the transverse stiffness of the portion of the balance shaft rotatably supported by the intermediate bearing being greater than that of the intermediate bearing. Under the condition of misalignment between the front end bearing and the rear end bearing, the housing contributes a load to the intermediate bearing to stabilise the intermediate bearing and increase the whirling frequency of the balance shaft by introducing a damping effect.

BRIEF DESCRIPTION OF THE DRAWINGS

Embodiments of the invention will now be described, by way of example only, with reference to the accompanying diagrammatic drawings, in which:

FIG. 1 is a partially cut-away isometric view of a primary balance shaft assembly for a three cylinder engine in accordance with the invention.

FIG. 2 is an outline sketch of the balance shaft assembly of FIG. 1 showing the assembly in a free state (solid line) and in an exaggerated radially flexed state (broken line).

DETAILED DESCRIPTION

As shown in FIG. 1, a self-contained balance shaft assembly in accordance with the invention is generally indicated by the reference numeral 1 and includes a self-contained tubular (elongate) housing 2 having a side-wall 3 and a central longitudinal axis 4. The housing 2 houses a rigid balance shaft 5 and is preferably formed from a steel tube, as an aluminium extrusion or as a plastics pultrusion. The housing 2 is formed of any suitable material that allows it to be at least partially flexible in a transverse direction 40 with respect to the balance shaft 5, as shown in FIG. 2, such that the housing is free to adopt a deflected shape 2a or an undeflected shape 2b. The flexibility of the housing 2 is selected so that the housing 2 is just sufficient to damp the balance shaft 5 whirling tendency.

In the present embodiment, a primary self-contained balance shaft assembly for a three cylinder engine is described. However, as will be appreciated by those skilled in the art, the present invention also extends to second order balance shafts for four cylinder engines.

The balance shaft assembly housing 2 has a front end 10 and a rear end 11. Each end of the housing 2 is swaged-to hold front and rear end bearings 6, 7 respectively for supporting the balance shaft 5 in the housing 2. The balance shaft 5 is further supported between the front and rear end bearings 6, 7 by an intermediate bearing 12. Although the invention is described with one intermediate bearing 12, it is to be understood that a balance shaft assembly 1 having more than one intermediate bearing 12 falls within the scope of the invention and the appended claims.

The front and rear end bearings 6, 7 are rigidly secured within the housing 2 by front and rear end caps 8, 9 respectively which are welded to the housing 2. Alternatively, the end caps 8, 9 may be bonded to the housing, or else the housing 2 and the front and rear end caps 8, 9 can be provided with co-operable connectors such as screw threads or the like or otherwise attached using any conventional means.

The front and rear end bearings 6, 7 are axially aligned with one another along the longitudinal axis 4 of the housing 2. The front and rear end caps 8, 9 support the front and rear end bearings 6, 7 respectively and are attached to the tubular housing side wall 3 as already described, such that the front and rear end bearings 6, 7 are mounted proximate the front and rear ends respectively.

The front and rear end bearings 6, 7 are rolling element bearings and are preferably of the type known as deep groove ball bearings in order to facilitate axial location of the balance shaft 5. In the given example the intermediate bearing 12 is a needle bearing but it will be appreciated by those skilled in the art that it may comprise any conventional type of bearing such as a hydrodynamic bearing.

In an alternative construction, the housing 2 is provided with induction hardened/polished bearing races to support the bearings 6, 7.

The balance shaft 5 is flexibly supported between the front and rear end bearings 6, 7 by the intermediate bearing 12.

The intermediate bearing 12 is flexibly mounted within the housing 2 by a flexible mounting 13 which can be of any suitable type such as a rubber ring or a spring. The tubular housing 2 contributes a load to the intermediate bearing 12 to stabilise the intermediate bearing 12 and prevent excessive flexing of the balance shaft 5 by increasing the whirling frequency of the shaft 5, i.e. the intermediate bearing 12 stabilises the shaft 5 and introduces a damping effect.

It is envisaged that in some applications the flexible mounting 13 may not be required. It is also envisaged that in some applications the intermediate bearing 12 may not be required.

The relative flexibility of the housing 2 allows a misalignment of the front and rear end bearings 6, 7 and the intermediate bearing 12 to support the shaft 5. The housing 2 is flexible in relation to the balance shaft 5, such that the balance shaft 5 has a greater transverse bending stiffness than the housing 2. In other words a transverse force applied to the middle of the housing 2 would result in greater mid-span deflection than the same transverse force applied to the middle of the balance shaft 5.

The flexible housing 2 and the flexibly located intermediate bearing 12 therefore facilitate the use of an increased length balance shaft 5 in the balance shaft assembly 1. The balance shaft 5 and hence the balance shaft assembly 1 can extend fully between the front and rear ends of an engine. The increased length of the balance shaft 5 increases the capacity of the balance shaft assembly 1 to address engine reciprocal inertia and in turn enhances noise reduction from an engine fitted with the balance shaft assembly 1.

Moreover, line boring of the balance shaft assembly 1 of the invention is not required as the flexible housing 2 and the flexibly mounted intermediate bearing 12 can accommodate increased misalignment. The portion of the balance shaft rotatably supported by the intermediate bearing 12 has a transverse stiffness relative to the front and rear end bearings greater than that of the intermediate bearing, so that if the intermediate bearing is misaligned relative to the front and rear end bearings, the intermediate bearing can displace transversely to correct the misalignment. This transverse flexibility can arise not only from the flexibility of the housing 2, but also from the flexibilty of the mounting 13 of the intermediate bearing 12 within the housing 2.

As indicated above, the intermediate bearing 12 can be a needle bearing, although any conventional type of bearing can be used, for example a hydrodynamic bearing. An advantage of a needle bearing made up of small cylinders or needles 15 upon which the shaft 5 rotates is that the diameter of the tubular housing 2 at the intermediate bearing 12 is not substantially increased. Thus, the diameter of the tubular housing 2 can be kept to a minimum. Moreover, a needle bearing can employ the tubular housing 2, or an insert, as an outer race.

The balance shaft 5 can be of any conventional type and is typically made from cast iron or steel.

The balance shaft 5 is made up of an elongate shaft 5 having a circular cross section. The balance shaft 5 is provided with balance weight mountings 14 along its length for mounting a first balance weight 20 and a second balance weight 21 on the balance shaft 5. The second balance weight 21 is offset with respect to the first balance shaft 20 on the balance shaft 5.

The first balance weight 20 and the second balance weight 21 are secured to the balance weight mountings 14 on the balance shaft 5 by balance weight mounting screws 22.

In an alternative embodiment of the invention, the balance shaft 5 can be made up of a front balance shaft portion and a contiguous rear balance shaft portion, where the front and rear balance shaft portions are approximately half-cylinders having a "D-shaped" cross-section that are axially offset with respect to each other. However, as will be appreciated by those skilled in the art, other alternative cross-sections of the shaft 5 may be employed.

The aforementioned offset construction partly cancels a primary order imbalance of a three cylinder engine created by the 120° disposition of the crank-pins. A second order balance shaft for a 4 cylinder engine requires balance weights 20, 21 on the same side of the shaft 5, so that the balance weights 20, 21 are not offset with respect to each other.

In summary, a three bearing system, in which there are provided front and rear bearings 6, 7 and an intermediate bearing 12, permits a fully supported full length balance shaft 5 (i.e. a balance shaft 5 that extends the full length of an engine) to be used. The flexibility of the tubular housing 2 relative to the balance shaft 5 avoids expensive line boring. The flexibility of the housing 2 provides a tolerance for movement of the balance shaft 5 within the housing 2. In particular, the flexibility of the housing 2 reduces the requirement for the precise alignment of the front and rear bearings 6, 7 and the intermediate bearing 12 as it permits a degree of static displacement of the intermediate bearing 12 whilst accommodating the tolerances of the housing 2 and also assembly tolerances. The flexible mounting 13 of the intermediate bearing 12 aids in accommodating the static displacement of the intermediate bearing 12 and the dynamic bending of the balance shaft 5.

The balance shaft assembly 1 is provided with a lubricating system independent of the engine lubricating system and which is sealed into the balance shaft assembly. The location of the lubricating system is generally indicated by the reference numeral 23. In particular, a lubricating fluid can be sealed into the balance shaft assembly 1 for the life of the assembly 1. A transmission fluid can be employed as a lubricating fluid. For example, a small amount of lubricating fluid can be added to the assembly 1 before the front or rear end caps 8, 9 are secured in place. A completely sealed self-contained balance shaft assembly 1 is therefore achieved that is lubricated for the life expectancy of the assembly 1 and which does not require periodic lubrication.

In use, the lubricating fluid is deflected to the outside (i.e. towards an inner face of the tubular housing side wall 3) due to the centrifugal force created by rotation of the balance shaft 5. Passages of air at or near the inner face of the housing 2 are created due to the close location of the balance shaft 5 within the housing 2. Thus, the lubricating fluid is driven away from the shaft 5 by rotation thereof, and the air passages carry the transmission fluid towards the front and rear end bearings 6, 7.

INDUSTRIAL APPLICABILITY

The balance shaft assembly 1 can be mounted on an engine using resilient mountings 18 (e.g. rubber rings) located at nodal points 19 on the housing 2. The resilient mountings 18 can enhance the flexibility of the housing 2 relative to the shaft 5.

The housing 2 of the balance shaft assembly can be simply cut to length according to engine size.

In most applications it will be advantageous for the side wall 3 of the housing 2 to have a constant wall thickness. However the side wall thickness may be varied if required, for example by positioning one or more cylindrical sleeves between the ends of the housing 2, the sleeve having an inside diameter closely corresponding to the outside diameter of the housing. A sleeve may, for example, be provided to reduce the rigidity of the housing 2 in the vicinity of a resilient mounting 18 and could be positioned, if required, between the resilient mounting and the side wall 3.

The balance shaft assembly 1 can be mounted internally within or externally of an engine and will typically be belt driven via an appropriate synchronous drive pulley (not shown) coupled at the balance shaft assembly front end 10. The tubular housing 2 and all resilient mountings 18 may be constructed such that the fundamental natural frequency is below the idle speed of an engine fitted with the balance shaft assembly 1.

Relative flexibility of the housing 2 reduces the requirement of precision bearing alignment by permitting a degree of static displacement of the intermediate bearing 12 while accommodating housing 2 and assembly tolerances. Furthermore, the flexibility of the housing 2 also avoids the use of heavy machined castings within the engine structure which are normally needed to ensure that both ends and the intermediate bearing are precisely aligned. Moreover, where the flexible mounting 13 is employed in combination with the intermediate bearing 12, the intermediate bearing 12 can "rock" to accommodate dynamic bending of the balance shaft 5.

The specific stiffness of the housing 2 is only just sufficient to damp the whirling tendency of the balance shaft 5. If the housing 2 is too stiff then the bearing load will be excessive. The fundamental natural frequency of the housing 2 and its mounting is below idle speed.

The balance shaft assembly 1 is self-contained and as such is filled with lubricant for its working life. The balance shaft assembly 1 can be fitted at an external face of an engine or beneath the sump of an engine at the end of engine production.

The front end bearing 6, the rear end bearing 7 and the intermediate bearing 12 together define a three-bearing system to facilitate the use of a balance shaft 5 that extends to the full length of an engine.

The self-contained balance shaft assembly 1 of the invention reduces parasitic heat phenomena in an engine. In particular, as the balance shaft assembly 1 can be located externally of an engine, heat radiates from the balance shaft assembly 1 to create a convection cooling effect.

The flexible balance-shaft housing 2, and hence balance shaft assembly 1 is relatively lightweight.

The balance shaft-assembly, being self-contained, may also be retrofitted to existing engines. Engines of different displacements will be different lengths and will have different out of balance forces. The change of length in different engines is accommodated in the present invention by cutting the housing 2 to suit the specific length. The different out of balance forces can be countered by using different weights.

The balance shaft 5 of the balance shaft assembly 1 can also be used as a lay shaft to transmit power from a rear gear train (not shown) to the front of the engine to drive front end accessories (e.g. water pump, alternator, fuel pump etc), and can also be used to drive a second balance shaft.

Modifications and improvements may be made to the foregoing without departing from the scope of the present invention.

What is claimed is:

1. A balance shaft assembly comprising:
   a flexible tubular housing having a front end and a rear end;
   a front end bearing mounted in the housing proximate the front end, a rear end bearing mounted in the housing proximate the rear end, and in intermediate bearing mounted in the housing between the front and rear ends;
   a balance shaft rotatably supported by the front end bearing, the rear end bearing and the intermediate bearing in the housing;
   wherein the portion of the balance shaft rotatably supported by the intermediate bearing has a resistance to transverse deflection relative to the front and rear end bearings greater than a resistance to transverse deflection of the intermediate bearing relative to the front and rear end bearings, wherein the portion of the balance shaft rotatably supported by the intermediate bearing has a transverse stiffness relative to the front and rear end bearings greater than a transverse stiffness of the intermediate bearing relative to the front and rear bearings.

2. A balance shaft assembly as claimed in claim 1, wherein the intermediate bearing is flexibly mounted in the housing.

3. A balance shaft assembly as claimed in claim 2, wherein the intermediate bearing includes a flexible mounting between the intermediate bearing and the housing.

4. A balance shaft assembly as claimed in claim 2, wherein the front and rear end bearings each include rolling elements.

5. A balance shaft assembly as claimed in claims 2, further including a front end cap secured to the front end of the housing and supporting the front end bearing and a rear end cap secured to the rear end of the housing and supporting the rear end bearing.

6. A balance shaft assembly as claimed in claim 2, further including a lubricant sealed within the housing.

7. A balance shaft assembly as claimed in claim 1, wherein the housing is flexible in relation to the balance shaft, such that the balance shaft has a greater transverse bending stiffness than the housing.

8. A balance shaft assembly as claimed in claim 7, wherein the front and rear end bearings each include rolling elements.

9. A balance shaft assembly as claimed in claims 7, further including a front end cap secured to the front end of the housing and supporting the front end bearing and a rear end cap secured to the rear end of the housing and supporting the rear end bearing.

10. A balance shaft assembly as claimed in claim 7, further including a lubricant sealed within the housing.

11. A balance shaft assembly as claimed in claim 1, wherein the front and rear end bearings each include rolling elements.

12. A balance shaft assembly as claimed in claim 1 further including a front end cap secured to the front end of the housing and supporting the front end bearing and a rear end cap secured to the rear end of the housing and supporting the rear end bearing.

13. A balance shaft assembly as claimed in claim 1, further including a lubricant sealed within the housing.

14. A balance shaft assembly as claimed in claim 1, further including a lubricant sealed within the housing.

15. A balance shaft assembly comprising:

an elongate housing provided with at least first and second bearings within said housing, and a balance shaft rotatably supported by said bearings, wherein the housing is flexible in relation to the balance shaft, such that the balance shaft has a greater transverse bending stiffness than the housing.

16. A method of loading a bearing in a balance shaft assembly comprising the steps of:

forming an elongate housing having a front end and a rear end;

mounting a front end bearing, a rear end bearing and an intermediate bearing in the housing;

rotatably supporting a balance shaft between the front end bearing, the intermediate bearing and the rear end bearing; and causing the intermediate bearing to become aligned with the front end and rear end bearings by lateral deflection of the intermediate bearing as a result of the transverse stiffness of the portion of the balance shaft rotatably supported by the intermediate bearing being greater than that of the intermediate bearing.

17. A method of loading a bearing in a balance shaft assembly as claimed in claim 16, further including the step of flexibly mounting the intermediate bearing in the housing.

18. A method of loading a bearing in a balance shaft assembly as claimed in claim 16, further including the step of resiliently mounting the balance shaft to an engine.

\* \* \* \* \*

UNITED STATES PATENT AND TRADEMARK OFFICE
CERTIFICATE OF CORRECTION

| | | |
|---|---|---|
| PATENT NO. | : 6,971,361 B2 | Page 1 of 1 |
| APPLICATION NO. | : 10/471679 | |
| DATED | : December 6, 2005 | |
| INVENTOR(S) | : Howard J. Lawrence | |

It is certified that error appears in the above-identified patent and that said Letters Patent is hereby corrected as shown below:

On Title page insert Item [73]
Please change the Assignee name on the cover sheet from Caterpillar, Inc. to Perkins Engines Company Limited as recorded on 9/12/2003 at Reel/Frame: 014854/0541.

Signed and Sealed this

Twentieth Day of March, 2007

JON W. DUDAS
*Director of the United States Patent and Trademark Office*